United States Patent [19]

Kenimer

[11] Patent Number: 5,011,007

[45] Date of Patent: Apr. 30, 1991

[54] ABSORBENT REPLENISHABLE GARAGE MAT

[76] Inventor: Barry K. Kenimer, 1615 Sunnywind Ct., Chesterfield, Mo. 63017

[21] Appl. No.: 273,417

[22] Filed: Nov. 18, 1988

[51] Int. Cl.⁵ .................... B65D 77/04; B65D 81/26
[52] U.S. Cl. .................................... 206/205; 206/223; 206/557; 220/1 C; 220/571
[58] Field of Search ............ 206/205, 223, 557; 220/1 C

[56] References Cited

U.S. PATENT DOCUMENTS

| | | | |
|---|---|---|---|
| 3,703,956 | 11/1972 | Oswalt | 206/223 |
| 4,201,307 | 5/1980 | Malloy | 220/1 C |
| 4,283,032 | 8/1981 | Smith | 206/223 X |
| 4,321,997 | 3/1982 | Miller | 206/205 X |
| 4,382,507 | 5/1983 | Miller | 206/205 |
| 4,392,552 | 7/1983 | Partridge | 220/1 C |
| 4,403,692 | 9/1983 | Pollacco | 206/223 |
| 4,484,661 | 11/1984 | Evenson | 220/1 C |
| 4,512,463 | 4/1985 | Ward | 206/223 X |
| 4,524,866 | 6/1985 | Pollacco | 206/223 |
| 4,533,042 | 8/1985 | Pollacco | 206/223 |
| 4,640,431 | 2/1987 | Harrison | 206/223 |
| 4,673,081 | 6/1987 | Habig et al. | 206/223 |
| 4,709,826 | 12/1987 | Wong | 220/1 C |
| 4,756,939 | 7/1988 | Goodwin | 206/205 |
| 4,801,005 | 1/1989 | Hahn et al. | 220/1 C |
| 4,801,006 | 1/1989 | Martin et al. | 206/223 |
| 4,802,599 | 2/1989 | Hill | 206/223 |
| 4,823,947 | 4/1989 | Maynard, Jr. | 206/223 |
| 4,895,250 | 1/1990 | Schifrin | 206/223 |

Primary Examiner—William I. Price

[57] ABSTRACT

A reservoir-containing garage mat, constructed of a semi-rigid material, into which one or more unfolded sections of standard newspaper are placed as the absorbent material. A meshed cover is placed over the newspaper and is removably attached to the mat to secure the newspaper in place. When placed underneath a motor vehicle, leaking liquid debris such as oil, transmission, hydraulic or radiator fluid, will pass through the mesh thereby making contact with the newspaper. The newspaper is replenished when stained or saturated.

9 Claims, 3 Drawing Sheets

ABSORBENT REPLENISHABLE GARAGE MAT

BACKGROUND OF THE INVENTION

1. Field Of The Invention

The invention relates generally to a device which is positioned on a garage floor underneath a motor vehicle and which can absorb leaking liquid debris such as oil, antifreeze, hydraulic fluid or transmission fluid and the absorbent material, once saturated, can be easily removed and replenished.

2. Description Of Prior Art

Prior art in respect to the prevention of soiling and staining of garage floors from leaking liquid debris from motor vehicles consist of the following methods:
  a. metallic and non-metallic drip pans placed underneath automotive equipment;
  b. inorganic absorbent materials such as clay or sand;
  c. synthetic absorbent materials such as carpet remnants, rugs or foams;
  c. organic absorbent materials such as saw dust, wood fluff, wood shavings, or wood pulp products such as cardboard, paper wadding and newspaper.

Newspaper absorbs well but is easily disarranged by traffic or wind. This invention will utilize standard newspaper as the absorbent material and will stabilize the newspaper in the desired position. Stained or saturated newspaper may be discarded and replenished afresh.

SUMMARY OF THE INVENTION

This invention relates to a device which can be placed on a garage floor underneath a motor vehicle to absorb leaking liquid debris. The device consists of a reservoir-containing mat into which an unfolded section, or sections, of standard newspaper can be placed to serve as the absorbing material. A cover of meshed material can be placed over the newspaper and attached to the mat, thereby securing the newspaper in place, yet allowing leaking liquid debris to pass through the mesh to make contact with the absorbing material. Once the newspaper is saturated, the mesh can be removed, the saturated newspaper discarded, and fresh newspaper replaced. This device, constructed of a semi-rigid material, will resist damage to itself if run over by a vehicle and will not inflict damage to the vehicle.

DESCRIPTION OF THE PREFERRED EMBODIMENT

Referring to FIGS. 1,2,3,4,5,6,7 and 8, an embodiment of an absorbent, replenishable garage mat is shown.

Referring to FIGS, 1,2,3,7 and 8 of the embodiment, a mat bottom 1 is shown in which the reservoir area 2 measures approximately 23 ½ inches by 27 ½ inches, which is the size of an unfolded section of standard newspaper. In the same figures the mat bottom 1 is bordered by a raised lip 3 which surrounds the absorbing newspaper and secures it in place.

Figure 1:
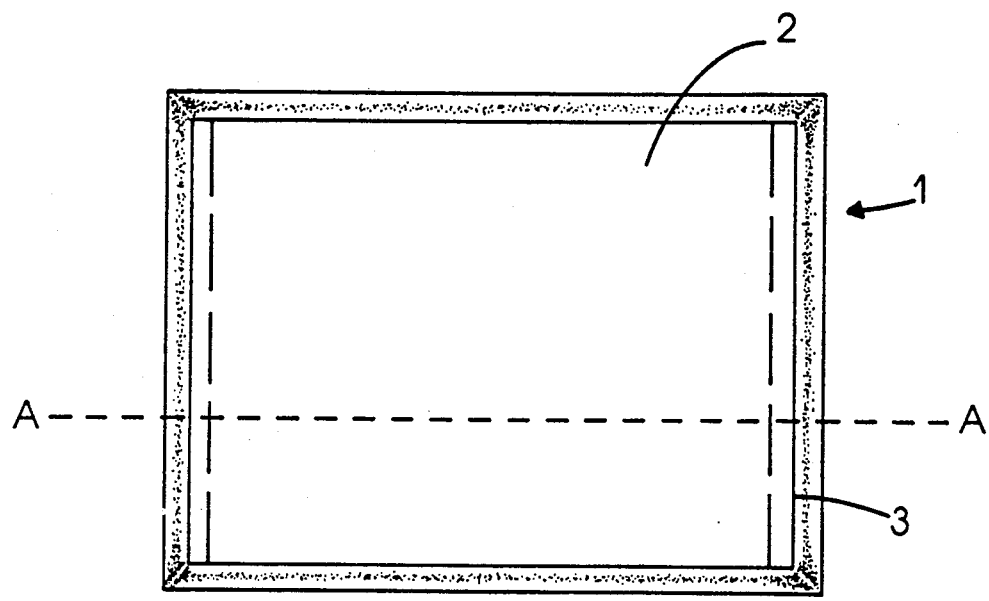
FIG. 1 is a top view of the mat bottom, approximate scale 1"=8".
Figure 2:
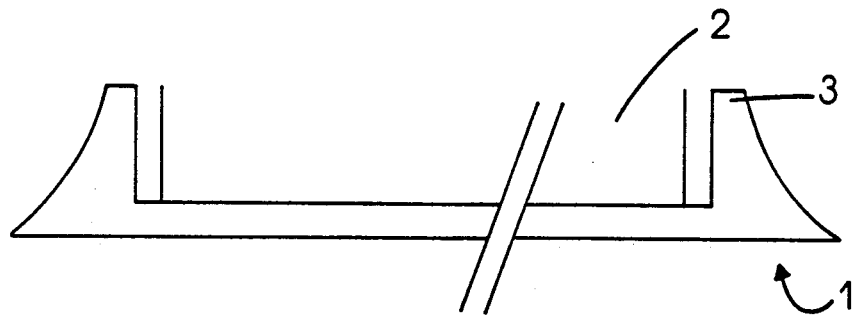
FIG. 2 is a cross sectional view along Section A—A of FIG. 1.
Figure 3:
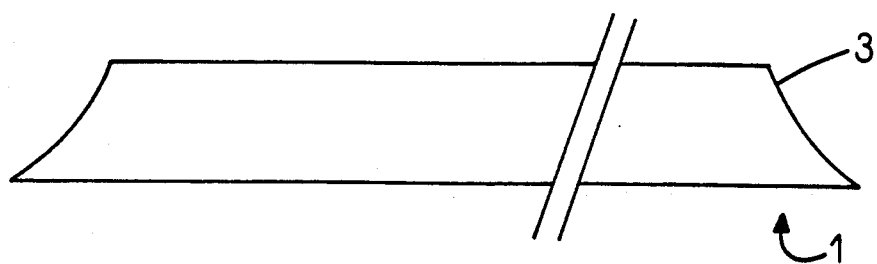
FIG. 3 is a side view of the mat bottom shown in FIG. 1.
Figure 4:
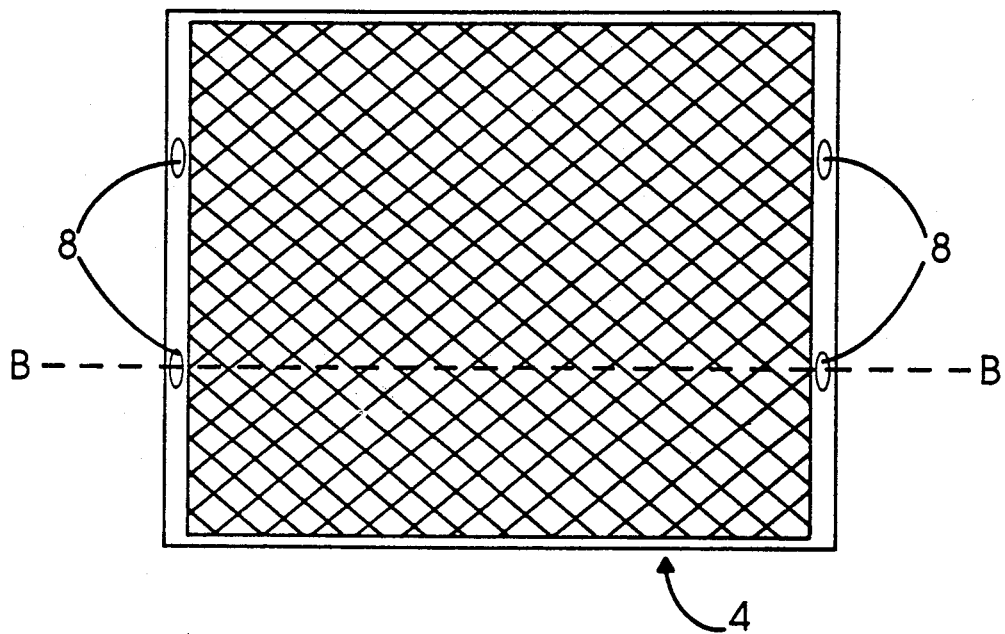
FIG. 4 is a top view of the mat cover, approximate scale 1"=8".
Figure 5:
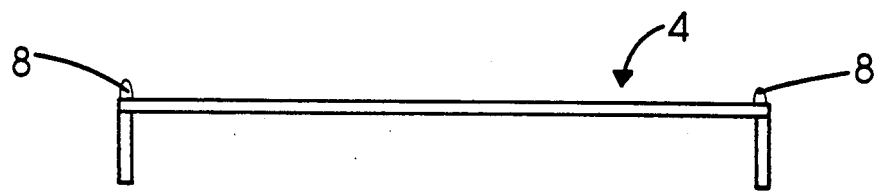
FIG. 5 is a cross sectional view along Section B—B of FIG.4.
Figure 6:
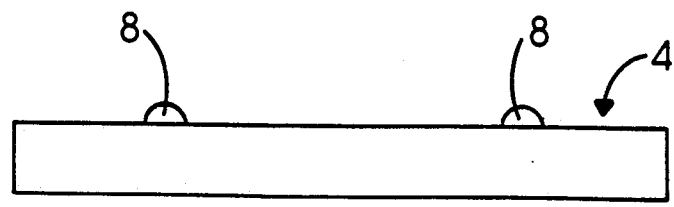
FIG. 6 is an end view of mat cover shown in FIG. 4.
Figure 7:
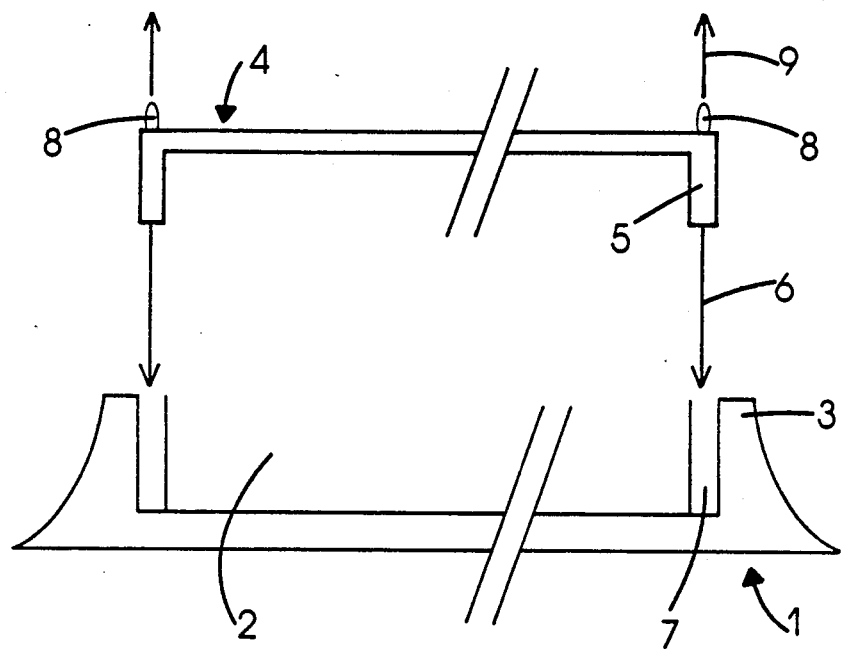
FIG. 7 is a cross sectional view of both mat top and bottom demonstrating tongue-in-groove mechanism for removably attaching top and bottom.
Figure 8:
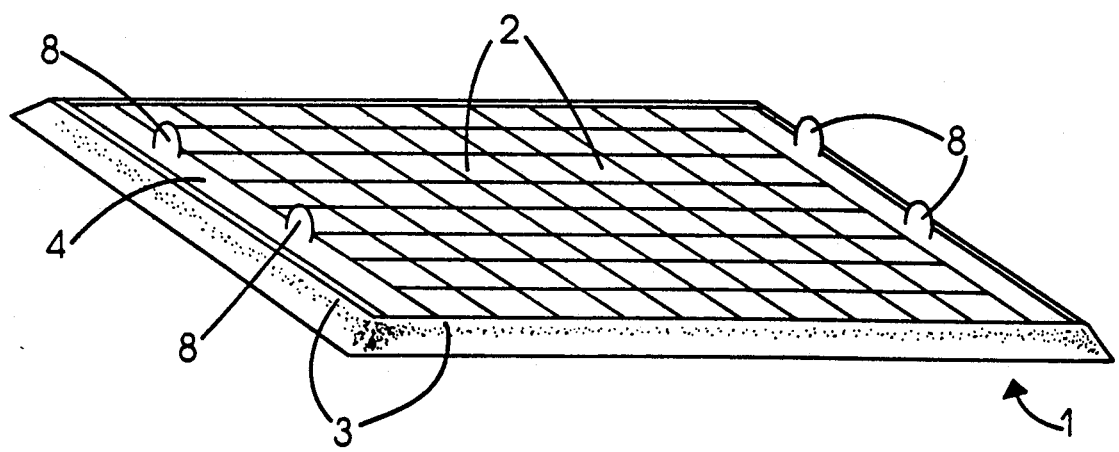
FIG. 8 is an oblique view of the mat top and bottom in the attached position.

Referring to FIGS. 4,5,6,7 and 8, the absorbing newspaper is further secured in place by the mat top 4 which is of a meshed design to allow liquid to make contact with the newspaper. Referring to FIG. 7, the mat top 4 removably attached to the mat bottom 1 by a tongue-in-groove connection. Pressure on the tongue 5 in the direction of the engage pressure arrow 6 will cause engagement in the groove 7. Traction on tabs 8 in the direction of the disengage pressure arrow 9 will cause disengagement of the tongue 5 form the groove 7.

Although one mat size is illustrated in this embodiment, this invention contemplates any size of mat reservoir to accomplish the equivalent result. For example, a mat reservoir of 55 inches by 23 ½ inches represents two unfolded sections of standard newspaper placed side-to-side. A mat reservoir of 47 inches by 27 ½ inches represents two unfolded sections of standard newspaper placed end-to-end.

I claim;

1. A rectangular-shaped mat of semi-rigid material containing and utilizing absorbent material to absorb liquid debris which drips from the underside of a motor vehicle, and comprising:
   (a) a lower portion of flat semi-rigid material with a continuous raised lip around the periphery thereby forming a reservoir for the absorbent material;
   (b) an upper portion of a meshed semi-rigid material which allows liquid debris to pass through freely, thereby making contact with the absorbent material within the reservoir;
   (c) a means for removably attaching the upper and lower portions so as to contain and secure the absorbent material.

2. A mat recited in claim 1 in which the absorbent material is at least one unfolded section of standard size 23 ½ inch by 27 ½ inch newspaper.

3. A mat recited in claim 1 in which the reservoir has an approximate dimension of 23 ½ inches by 27 ½ inches to accommodate at least one unfolded standard newpaper as the absorbent material.

4. A mat recited in claim 1 in which the reservoir has an approximate dimension of 55 inches by 23 ½ inches to accommodate at least two unfolded sections of standard newspaper placed side-to-side as the absorbent material.

5. A mat recited in claim 1 in which the reservoir has an approximate dimension of 47 inches by 27 ½ inches to accommodate at least two unfolded sections of standard newspaper placed end-to-end as the absorbent material.

6. A mat recited in claim 1 in which the means for removably attaching the upper and lower portions comprise a tongue-in-groove connection.

7. A mat recited in claim 1 in which the mat is flexible enough to allow the mat to be rolled into a scroll for easy handling.

8. A mat recited in claim 1 in which the mat material is vinyl plastic.

9. A mat recited in claim 1 in which the mat material is rubber.

* * * * *